(12) United States Patent
Domo et al.

(10) Patent No.: US 8,276,972 B2
(45) Date of Patent: Oct. 2, 2012

(54) UNDERCARRIAGE FAIRING

(75) Inventors: James Francis Domo, Chagrin Falls, OH (US); Patrick Edward Ryan, Auburn Township, OH (US)

(73) Assignee: Aerodynamic Trailer Systems, LLC, Auburn, OH (US)

( * ) Notice: Subject to any disclaimer, the term of this patent is extended or adjusted under 35 U.S.C. 154(b) by 58 days.

(21) Appl. No.: 12/877,223

(22) Filed: Sep. 8, 2010

(65) Prior Publication Data

US 2011/0068605 A1    Mar. 24, 2011

Related U.S. Application Data

(60) Provisional application No. 61/244,929, filed on Sep. 23, 2009.

(51) Int. Cl.
*B62D 35/02* (2006.01)
(52) U.S. Cl. .................................. 296/180.1; 296/180.4
(58) Field of Classification Search ............... 296/180.1, 296/180.4, 180.5, 181.5; D12/106; 105/1.1, 105/1.2, 1.3; 180/903; 248/628; *B62D 35/02*
See application file for complete search history.

(56) References Cited

U.S. PATENT DOCUMENTS

| | | | |
|---|---|---|---|
| 4,262,953 A | 4/1981 | McErlane | |
| 4,421,354 A | 12/1983 | Lemaster | |
| 4,455,045 A * | 6/1984 | Wheeler | 296/181.5 |
| 4,486,046 A | 12/1984 | Whitney et al. | |
| 4,640,541 A * | 2/1987 | FitzGerald et al. | 296/180.1 |
| 5,280,990 A * | 1/1994 | Rinard | 296/180.1 |
| 5,595,419 A * | 1/1997 | Spears | 296/180.2 |
| 6,837,536 B1 | 1/2005 | Schwartz | |
| 6,974,178 B2 | 12/2005 | Ortega et al. | |
| 7,093,889 B2 * | 8/2006 | Graham | 296/180.4 |
| 2004/0155485 A1 * | 8/2004 | Hamnett | 296/180.1 |
| 2005/0146161 A1 * | 7/2005 | Uland | 296/180.1 |
| 2008/0093887 A1 * | 4/2008 | Wood | 296/180.4 |
| 2008/0238139 A1 | 10/2008 | Cardolle | |
| 2008/0296930 A1 | 12/2008 | Roush et al. | |
| 2008/0303311 A1 | 12/2008 | Roush | |
| 2009/0146453 A1 | 6/2009 | Ortega et al. | |

FOREIGN PATENT DOCUMENTS

CA     1156293 A  * 11/1983
WO    WO 2004062953 A2 *  7/2004

* cited by examiner

*Primary Examiner* — Glenn Dayoan
*Assistant Examiner* — Sunsurraye Westbrook
(74) *Attorney, Agent, or Firm* — Fay Sharpe LLP; Karl W. Hauber (57) ABSTRACT

The present disclosure provides an airstream deflector fairing comprising a front or fore end having a leading edge attached to an undercarriage of a wheeled vehicle. The fairing further includes a rear or aft end and a lower bottom portion of the fairing includes a panel facing the ground at an angle which in turn directs an airstream passing thereunder downwardly and outwardly relative to the undercarriage and substantially at an area below a trailing axle downstream from the fairing. The lower bottom panel includes an angle of declination relative to the undercarriage from about 12 degrees to about 24 degrees.

29 Claims, 12 Drawing Sheets

UNDERCARRIAGE FAIRING

BACKGROUND

The present invention claims priority on U.S. Provisional Application Ser. No. 61/244,929 filed Sep. 23, 2009 which is incorporated herein by reference.

The present disclosure relates to devices for increasing fuel efficiency with proportional harmful emission reductions and greater driving safety by deflecting and otherwise altering the airflow underneath the body or carriage of a box van trailer, flat bed, truck trailer rig, box truck, or the like.

It is well known that the fuel efficiency of any motor driven vehicle is directly related to the vehicle's aerodynamic structure and/or shape and the amount of air turbulence caused by the movement of the vehicle. The greater the air turbulence created by the vehicle and its aerodynamic performance during head on and cross winds, the greater the resistance, and the more fuel required to move the vehicle. In today's economy, fuel efficiency and reduction of harmful emissions are of major concerns and are particularly relevant when considered in terms of large tractor trailers, or other box-like trucks, used for transporting goods wherein the cost of fuel consumed moving the goods directly affects the market price of the goods.

As the trailer of a large tractor trailer is pulled forward by the tractor, a great deal of turbulence is created at the rear face and underneath the trailer as the moving vehicle disturbs the air. This turbulence results in increased resistance, i.e. drag, to forward movement of the trailer and thus lower fuel efficiency.

Although fuel efficiency and reduction of harmful emissions have become primary concerns in the recent decade because of environmental concerns about harmful emissions and fuel costs, a second major consideration is that of increasing the safety of operation of tractor trailer rigs, particularly from the point of view of safety of other motorists sharing the road with such rigs. A major disadvantage of tractor trailers on the highway is that, unaltered, the turbulent air flow beneath and behind a tractor trailer is generally in a direction transverse to that of the movement of the tractor trailer. This means that in wet or snowy conditions, mist and/or snow is thrown laterally of the trailer causing a vision and turbulence problem for any motorist passing or being passed by the tractor trailer rig.

SUMMARY

It is an object of this disclosure to increase fuel efficiency and reduce proportional harmful emissions of a motor vehicle such as a tractor trailer rig, by decreasing turbulence caused by its forward movement and thus reducing resistance to the forward movement in addition to improve the aerodynamic profiles of trailers and box trucks when exposed to winds at angles to the direction of travel. This is accomplished by redirecting the airstream passing underneath the vehicle to flow generally or, i.e. below, or under, the rear axle set and around the rear tire and wheel assemblies of the vehicle in the lower portion thereof.

Another object is to present an improved fairing profile to winds that are at an angle to the direction of travel and/or transverse to the direction of travel.

Yet another object of this disclosure is to provide a fairing device which increases traffic safety by decreasing the kickup of water spray, mud, snow, or other debris from beneath the wheels of a forwardly moving vehicle, particularly at the rear and sides thereof.

A further object of this disclosure is to provide a device which reduces the buildup of snow, ice and other deposits on the rear axle(s), cross members, and surfaces of the various components located between and around the rear wheels on the rear end of a vehicle.

A still further object of this disclosure is to provide a device or shield which protects components (i.e. brake cables/lines and related suspension springs etc.) attached to the undercarriage of the trailer from the elements and other road debris. In addition, the fairing also improves the aerodynamics around these components.

Still further, the disclosure provides a fairing device that simplifies mounting and can be attached without drilling into the undercarriage of a trailer thus eliminating cumbersome mounting arrangements, and permanent modifications to the undercarriage, heretofore known.

The present disclosure provides an airstream deflector fairing comprising a front or fore end having a leading edge secured to an undercarriage of a wheeled vehicle. The fairing further includes a rear or aft end having a width and a lower bottom panel. The lower bottom panel faces the round at an angle which in turn directs an airstream passing thereunder downwardly and outwardly relative to the undercarriage and substantially at an area below a trailing axle and wheel assembly downstream from the fairing. The lower bottom panel can include an angle of declination relative to the undercarriage from about 12 degrees to about 24 degrees.

The present disclosure further provides a three, four, or five sided airstream deflector comprising an airstream deflector fairing including a front end having a leading edge attached to an undercarriage of a wheeled vehicle. The fairing includes a rear end having a width and a lower bottom panel which connects the front end and the rear end. The bottom panel faces the ground and directs an airstream passing thereunder downwardly and outwardly relative to the undercarriage and substantially at an area below a trailing axle and wheel assembly following the fairing. The lower bottom panel includes an angle of declination relative to the undercarriage from about 12 degrees to about 24 degrees. The fairing includes a first side panel and a second side panel wherein the lower bottom panel extends between the first side panel and the second side panel. The first side panel and the second side panel are each substantially planar along at least a portion thereof and function to deflect air around the sides of the trailing rear tire sets. The airstream area is substantially between the ground surface below and a horizontal plane parallel to the ground surface and intersecting the trailing axle above.

DETAILED DESCRIPTION

The present disclosure relates to an airstream fairing device deflector or fairing 10 which, when mounted to the undercarriage 14 of a motor driven vehicle 8, improves the aerodynamics of the vehicle 8, thereby increasing its fuel efficiency with proportional harmful emission reductions. In addition, the fairing 10 reduces the agitation and pickup of water spray and the like from the roadway traversed by the vehicle 8. The airstream deflector 10 of the present disclosure deflects the turbulent stream of air passing underneath the vehicle 8 to directly under, or below, the rear axles 16 and around the lower portion of the following, i.e. downstream, tires 15 and axle 16 of the vehicle 8. The deflector's 10 unique aerodynamic design and mounting position dramatically changes the air flow and aerodynamic profiles of the surfaces presented to the airstreams and reduces the turbulence created by these streams of air as they impact the aerodynamically undesirable rear end components.

The airstream deflector 10 comprises a generally trapezoidal shaped panel of sufficient dimensions having a fore end 11 and an aft end 13 to laterally span a majority of the width (i.e. less than the full width) of the undercarriage 14 of the vehicle 8 to which it is to be mounted, such as the trailer 18 of a tractor trailer rig. The mounting position can be in a location well forward of the following, trailing, or downstream tires 15 of the trailer 18. In one mounting arrangement, the deflector 10 is from about 4 feet to about 16 feet upstream from the trailing tires 15. The present disclosure provides a fairing 10 mounted generally proximal to the mid-point of the trailer 18, i.e. the front end 11 of the fairing 10 can be approximately 15-28 feet from the front 19 of the trailer 18, and independent of the varying positions of the rear tires 15 of the trailer 18 downstream from the fairing.

Figure 12:
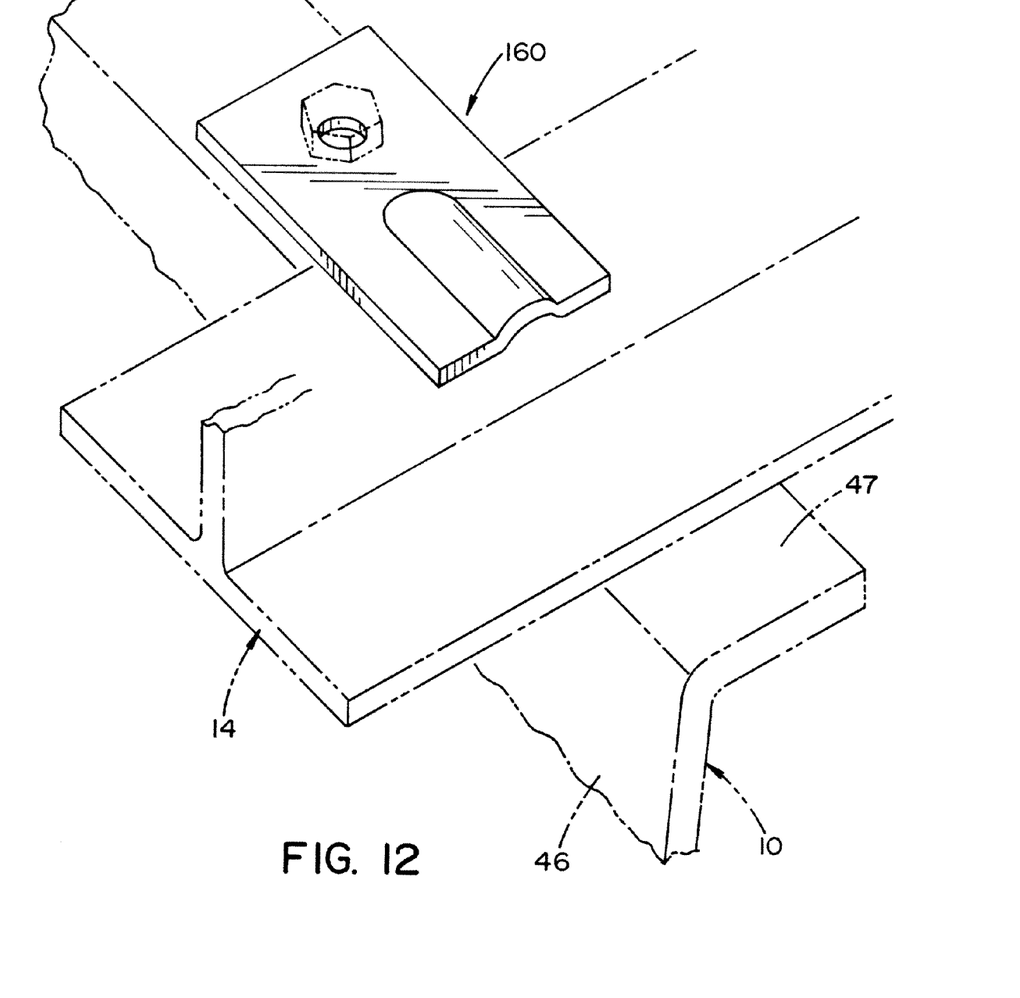
FIG. 12 is a perspective view of a clamp used to secure the fairing to the undercarriage of a trailer; and, FIG. 13 is a table displaying wind tunnel test results showing the percent improvement in fuel efficiencies at different speeds (mph) for different types/sizes of side skirts and the subject undercarriage fairing of the present disclosure.

The forwardmost edge 20 of the fairing 10 can be suitably positioned close to, or adjacent to, the undercarriage 14 of the body or trailer 18 of the vehicle, and secured thereto as by clamp or retention means (see FIG. 12). The deflector fairing 10 can be positioned in front of the trailer slide rails 30 of the vehicle 18 such that the mid-point of the fairing 10 is located generally at the mid-point of the trailer. In particular, the positioning of the fore end 11 of the fairing 10 can be from about 15 feet to about 28 feet from the front edge 19 of the trailer 18. In the aforementioned mounting arrangement, the aft end 13 of the fairing 10 is forward of the trailer slide rails 30 which eliminates any interference that may be caused from varying the rear tire positions fore and aft 31 along the slide rails 30. The deflector's main panel 40 can include an angle of attack, i.e. angle of declination 42 rearward, directed downwardly at an angle from about 12 degrees to about 24 degrees relative to a plane comprising the horizontal underside 14 of the trailer 18.

The purpose of the main panel or ground facing bottom panel 40 of the deflector fairing 10 is to deflect the air stream into a path well below the underbody 14 of the trailer 18 and primarily into the area generally below the following or downstream axle 16 and between the centers of the following left and right tire sets 15 of the vehicle 8. The substantially planar facing sides 46, 48 present streamlined surfaces and redirect air flow substantially at and below, and around the leading or forwardmost surfaces of the following tires 15.

The deflector fairing 10 can be a three or four sided open shell design, or a four or five sided closed design. In one version, the deflector fairing 10 can serve as a shield for equipment retained under the associated trailer. In another version, the deflector fairing 100 can serve as an enclosure for equipment retained under the associated trailer 18 (refer to FIG. 11). In either version, the deflector 10, 100 provides a device for the protection of the equipment therein from the elements. In this manner, the equipment protected inside, or within, the deflector fairing 10, 100 is shielded from wind, water, snow, salt, and other grime/dirt that is splashed around under the trailer 18. The aft end 13 can include drain holes (not shown) for enabling water to be expelled from fairing 10.

Referring to FIGS. 1-10, the main, or bottom, panel 40 deflects the airstream downward primarily into the area generally below the following axle(s) 16 and in a trajectory engaging the roadway at a shallow angle which redirects air and prevents impact with the aerodynamically poor/higher resistant rear axle 16, components located above and adjacent to it, suspended brake line cabling, undercarriage support beams, and the lateral deflection of the airstream. The fairing 10 concentrates the airstream into contact with the downwardly moving and receding tread and side surfaces of the following tires 15, which collectively provides what may be termed a "blanket" of relatively high velocity air on the roadway. Simultaneously, the fairing 10 substantially reduces the airstream contact with non-receding trailer surfaces such as the following axle(s) 16 and the forwardly moving upper portions of the following tire treads and sides. Such reduced air contact with non-receding trailer surfaces reduces drag on the trailer 18, and the "blanket" of air behind the fairing 10, primarily below axle level, tends to hold down water, mud or snow kickup from the roadway and to also keep the rear end 21 of the trailer 18 clearer of accumulated mud or snow. It is to be appreciated that less kickup of mud or snow into the reduced pressure zone behind the end of the trailer 18 occurs with the water, mud or snow on the roadway tending to stay at or near roadway level until the reduced pressure zone at the end of the trailer is past. Such deflection of the airstream into the following tires and wheels also acts to cool the tires and the brakes of the vehicle as it travels along the roadway.

Figure 1:
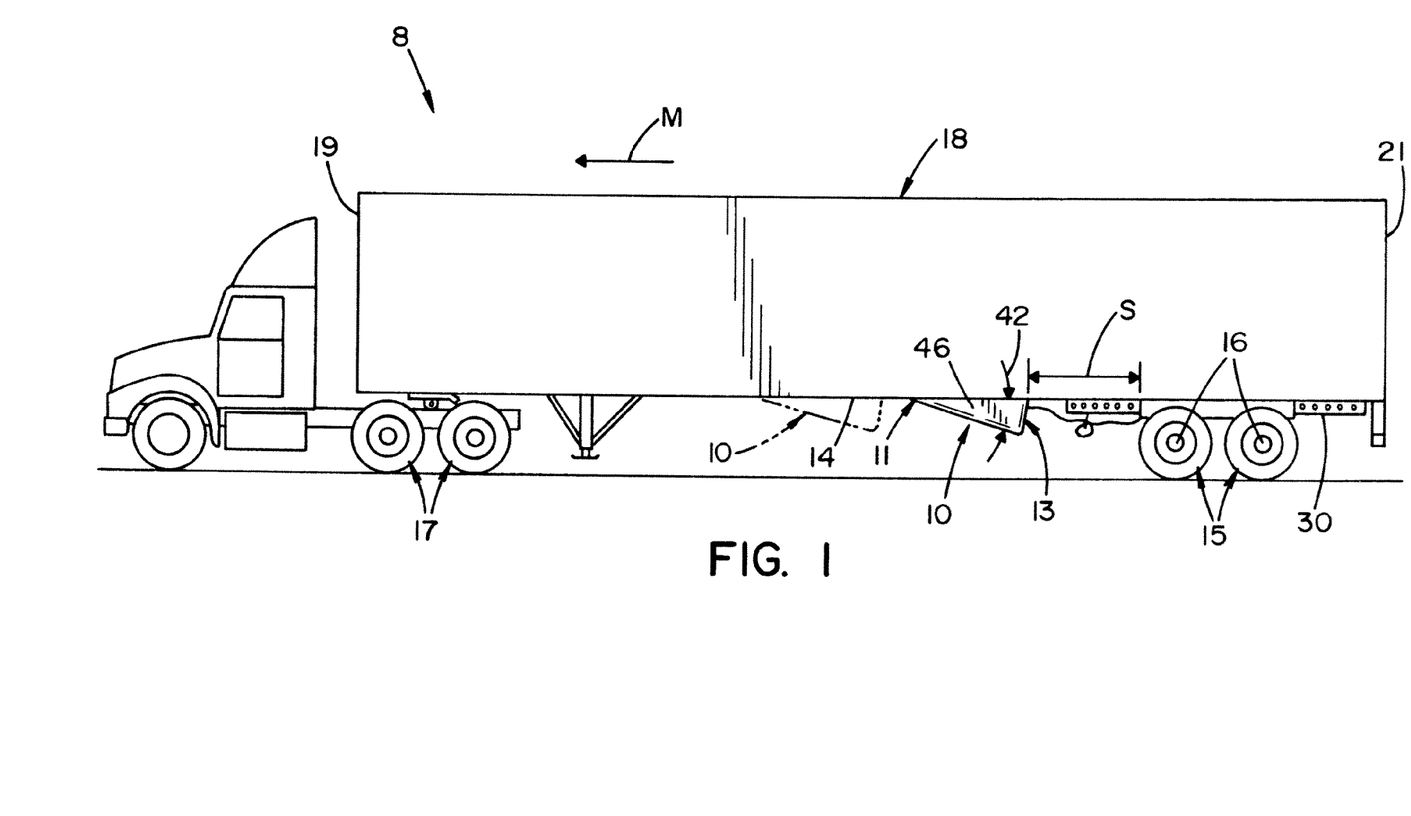
FIG. 1 is a side elevation view of a tractor trailer rig illustrating one exemplary mounting location and an angle of attack of an airstream fairing deflector assembly according to one embodiment of the present disclosure.

FIG. 1 schematically portrays a typical large tractor-trailer rig comprising the box-like trailer 18, both conventional per se and generally greater than 70 feet in length overall, along with a 45-60 foot trailer of typical dimensions. As will be understood, the rear wheels 17 of the tractor support the forward end of the trailer 18 and the rear end 21 thereof is typically supported by the following tandem axle and dual-wheel assembly, including dual wheels and tires 15 at each end of each axle 16. The leading tires and leading axle of the trailer 18, for purposes of description of the embodiments of the disclosure, follow (i.e. positioned downstream) the tractor rear tires 17 and follow the under trailer deflector fairing 10 assembly of the present disclosure as the rig moves over the roadway in a direction of movement schematically indicated at M.

As shown in FIGS. 2-10, the fairing 10 can comprise a rectilinear, and/or curvilinear, configuration including a profile having a three, four, or five sided open shell, or closed, design. The fairing 10 can be comprised of aluminum alloy, resin composite, plastic, polyester, polyolefin, or other suitable materials that provide a structure to withstand the wind and debris commonly encountered on the underside 14 of the tractor trailer 18. In particular, the fairing material can be flexible and impact resistant. Various polymer materials can be used that provide resistance to permanent deformation upon impact and provide flexibility through a wide range of ambient temperature. The material can be on the order of thickness between 1/16" and 3/16". The fairing 10 further may include several internal vertical support ribs 50 in order to provide additional flexible support to the shape while providing 'elastic memory' to resist permanent plastic deformation. The ribs 50 can be generally equi-spaced from one another and span substantially the length of the fairing 10. The ribs 50 can be triangular in shape including vertical reinforcement members 52 and generally correspond to the shape of the sides 46, 48 of the fairing 10. In addition, the fairing can also be a closed shell or solid body design such as a polyurethane foam material. The fairing 10 can laterally span a majority of the width of the underside 14 of the trailer 18 wherein the aft ends 60, 62 of the opposing side panels 46, 48 are generally aligned with the midpoint 63, 65 between the two tires, or dual tire set, on opposing sides of the trailer 18. In one particular advantageous arrangement, the width of the fairing comprises from about 65% to about 95% of the width W of the underside 14 of the trailer 18.

The airstream deflector 10, in particular detail comprises a front end 11 having a leading edge 20 attached to an undercarriage of a wheeled vehicle. The fairing 10 further includes the rear end 13 having a width and the front end 11 having a width. The front end width can be from about 3 feet to about 5 feet in width. The front end width 33 is less than the rear end width 35 and the lower bottom panel 40 extends in a planar form from the front end leading edge 20 to the rear end 13. The front end width 33 can be from about 55% to about 25% less than the rear end width 35.

The deflector can extend (i.e. drop height 37 at the aft end) approximately 15-32 inches from the undercarriage 14 of the trailer 18 which minimizes exposure to damage from debris, road hazards and projections including curbs, RR crossings, loading dock ramps, etc. The drop height 37 can be on the order of 1 inch of drop for each 3 to 4 inches in length of the fairing 10. It is to be appreciated that the lower bottom panel 40 maintains an angle of declination relative to the undercarriage from about 12 degrees to about 24 degrees. Prior art devices extend further and much closer to the road. The aforementioned geometry of the present disclosure provides a significantly lower cost design to manufacture. It is to be appreciated that the unique design including a shallower height, reduced width, and unique mounting position provides significantly less exposure to damage, and removes interference with rear tire adjustable placement while yielding a more efficient and lower cost air deflector.

The mounting position provides a space S between the rear or aft end 13 of the fairing 10 and the rear tire set 15. In one embodiment, the space S is forward of the slide rails 30, thereby accommodating fore and aft movement of the rear tire set without necessitating movement of the fairing. The fairing can be centered along a width of the undercarriage and the front end width 33 can be from about 40% to about 60% of the width W of the undercarriage 14, and the rear end width 35 can be from about 65% to about 95% of the width W of the undercarriage 14. In one mounting arrangement, the rear or aft end width 35 spans the undercarriage 14 of a wheeled vehicle substantially from the midpoint of one rear tire set 63 to the midpoint of another rear tire set 65, i.e. from about 80% to about 85% of the width of the undercarriage 14. Additionally, the deflector 10 can be mounted with a clamping system (to be described in more detail hereinafter) that requires no drilling or modification to the undercarriage 14.

The fairing further includes the first side panel 46 and the second side panel 48, wherein the lower bottom panel 40 extends in a planar form between the first side panel 46 and the second side panel 48. The first side panel 46 can include a first side edge or flange 47 and the second side panel 48 can include a second side edge or flange 49 wherein the first side edge 47 and the second side edge 49 are proximal to the undercarriage. The first side panel 46 and the second side panel 48 can each have a curvilinear section 57, 59, respectively, along at least a portion thereof for deflecting cross winds traveling at an angle relative, or transverse, to the direction of travel M. As discussed above, the airstream area, downstream from the fairing 10, is generally between the ground surface below and a horizontal plane parallel to the ground surface and intersecting the trailing axle(s) 16 above.

Figure 2:
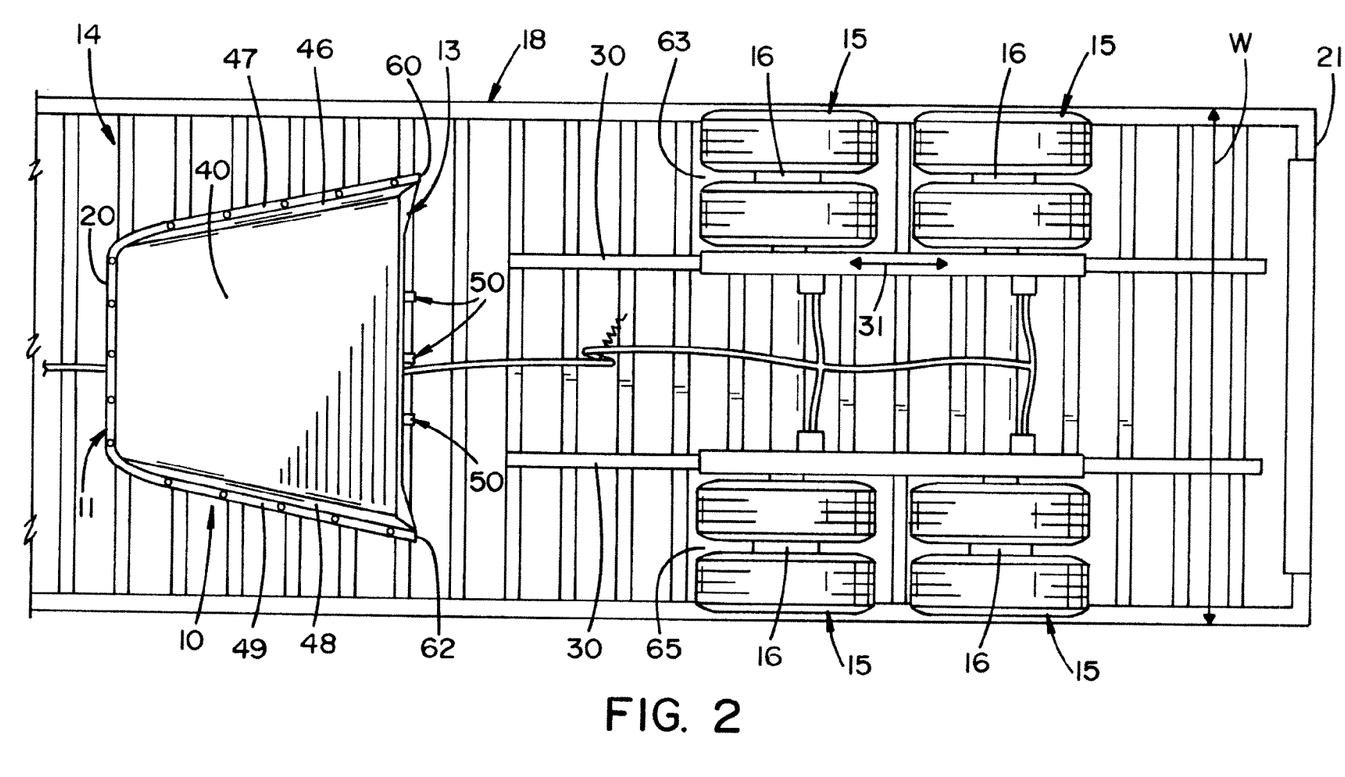
FIG. 2 is a partial bottom view of the trailer rig and airstream fairing deflector of FIG. 1.
Figure 3:
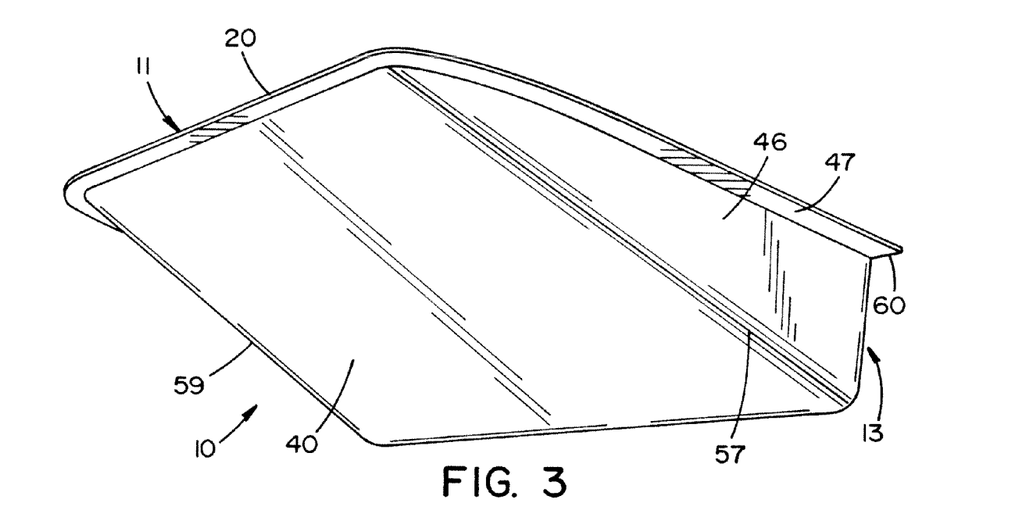
FIG. 3 is a side perspective view of the airstream fairing deflector of FIG. 1.
Figure 4:
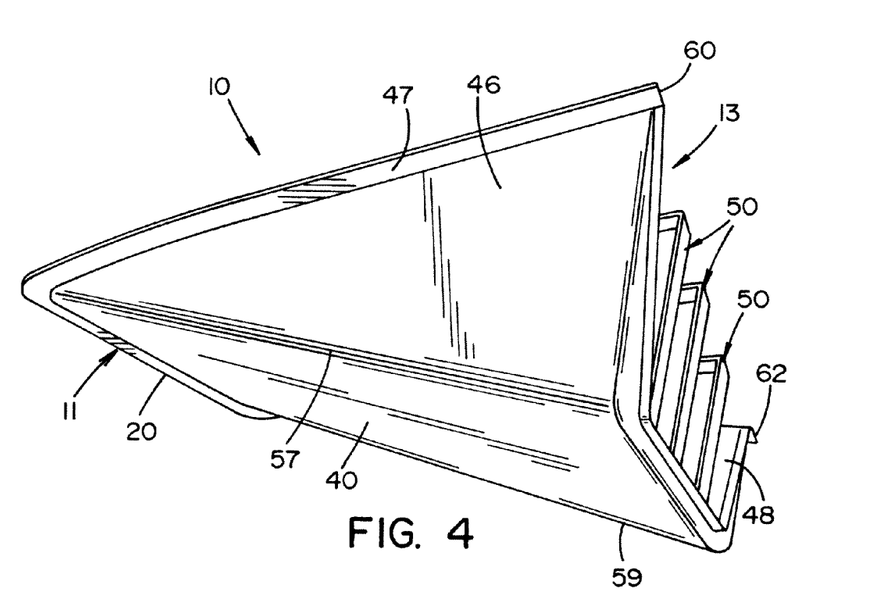
FIG. 4 is another perspective view of the airstream fairing deflector of FIG. 1.
Figure 5:
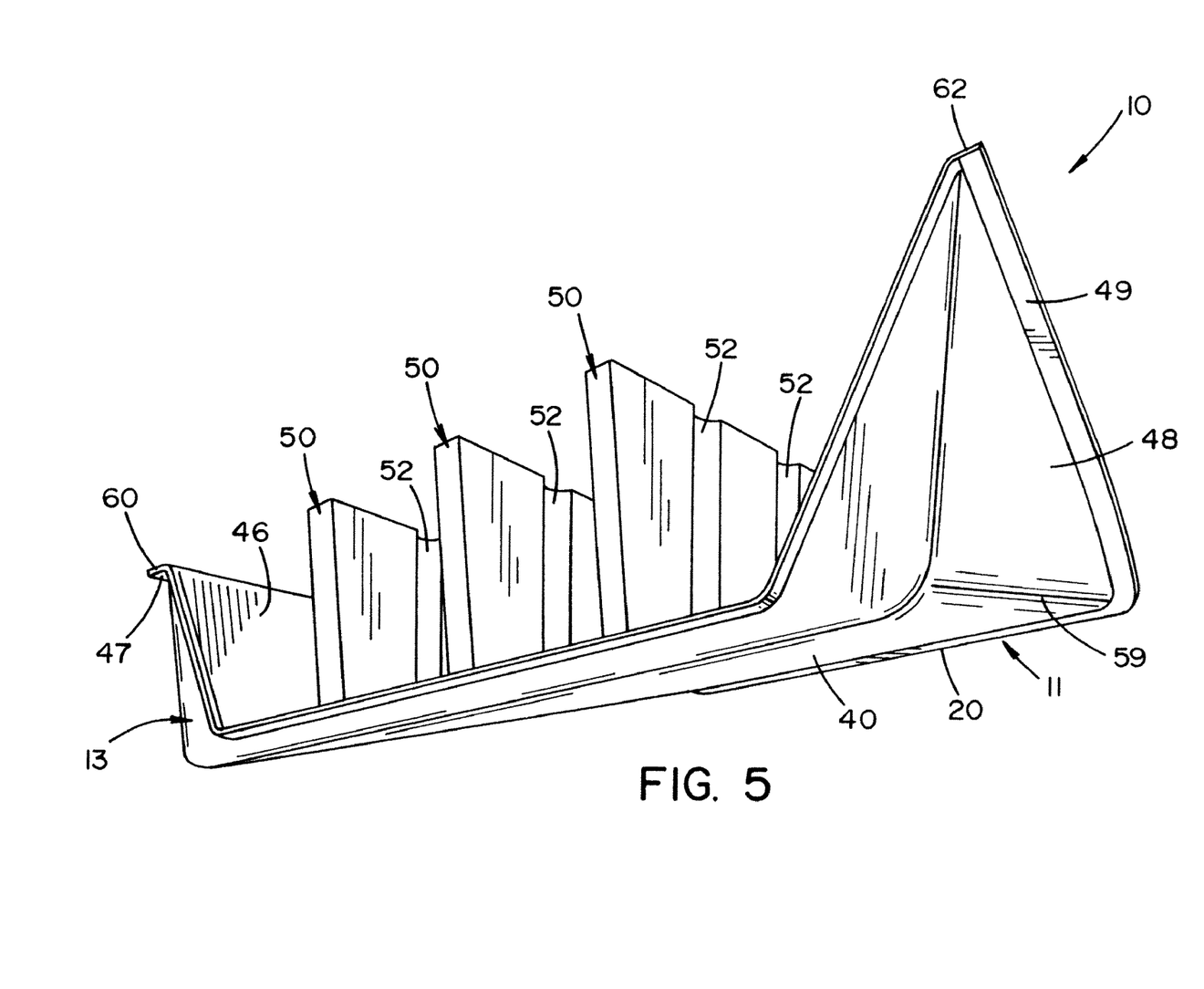
FIG. 5 is a rear perspective view of the airstream fairing deflector of FIG. 1.
Figure 6:
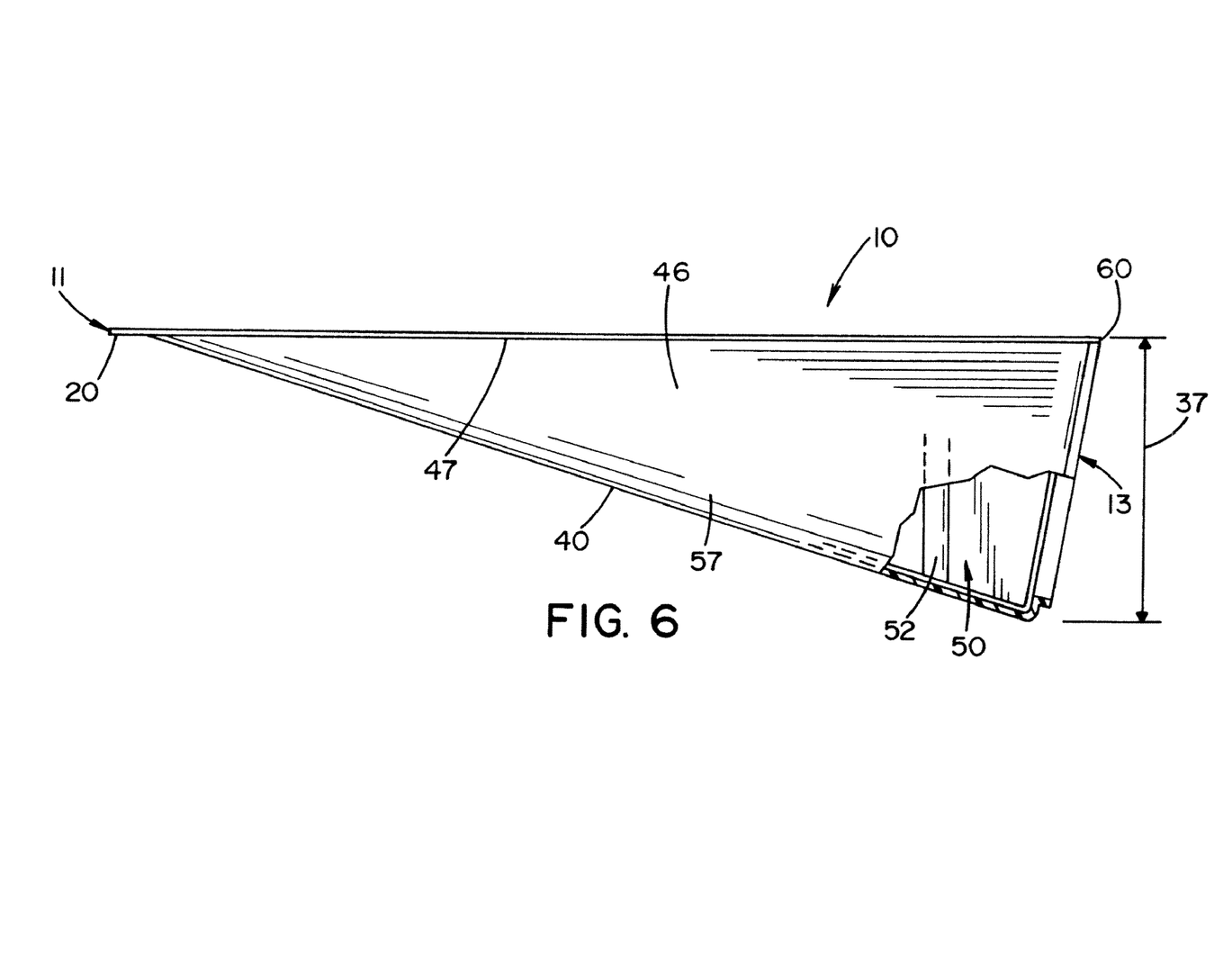
FIG. 6 is a side elevational view of the airstream fairing deflector of FIG. 1.
Figure 7:
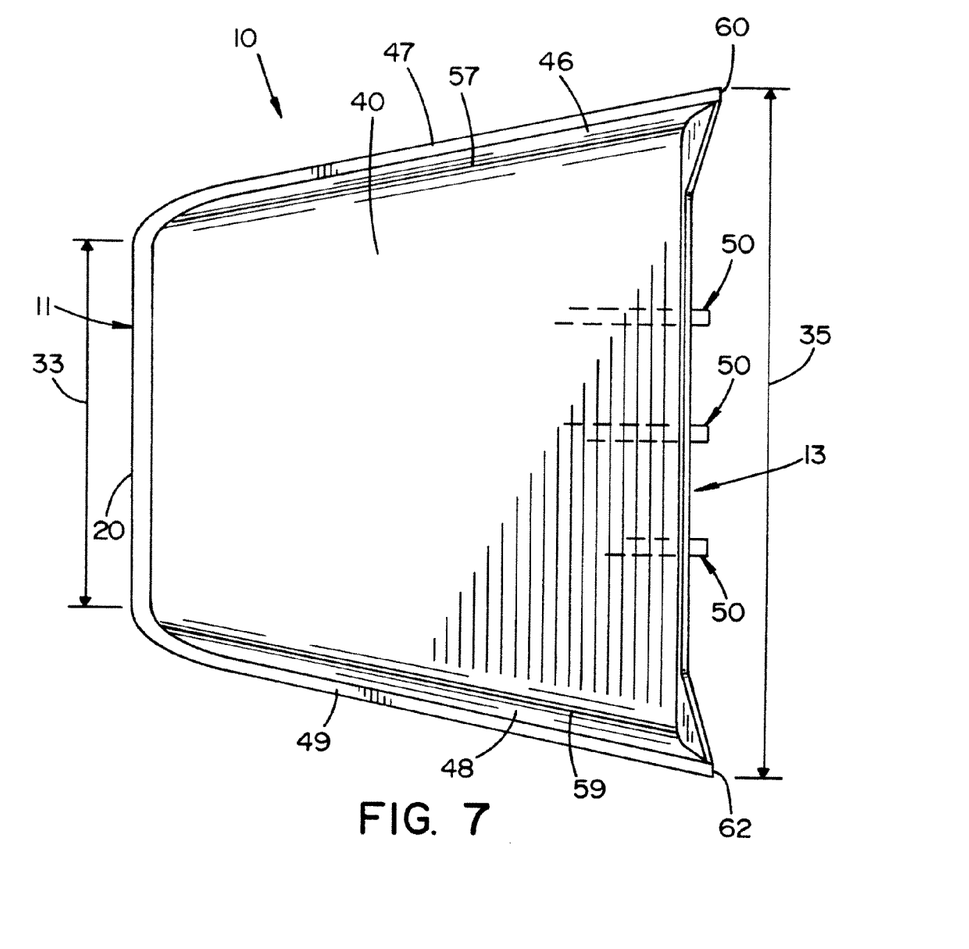
FIG. 7 is a bottom elevational view of the airstream fairing deflector of FIG. 1.
Figure 8:
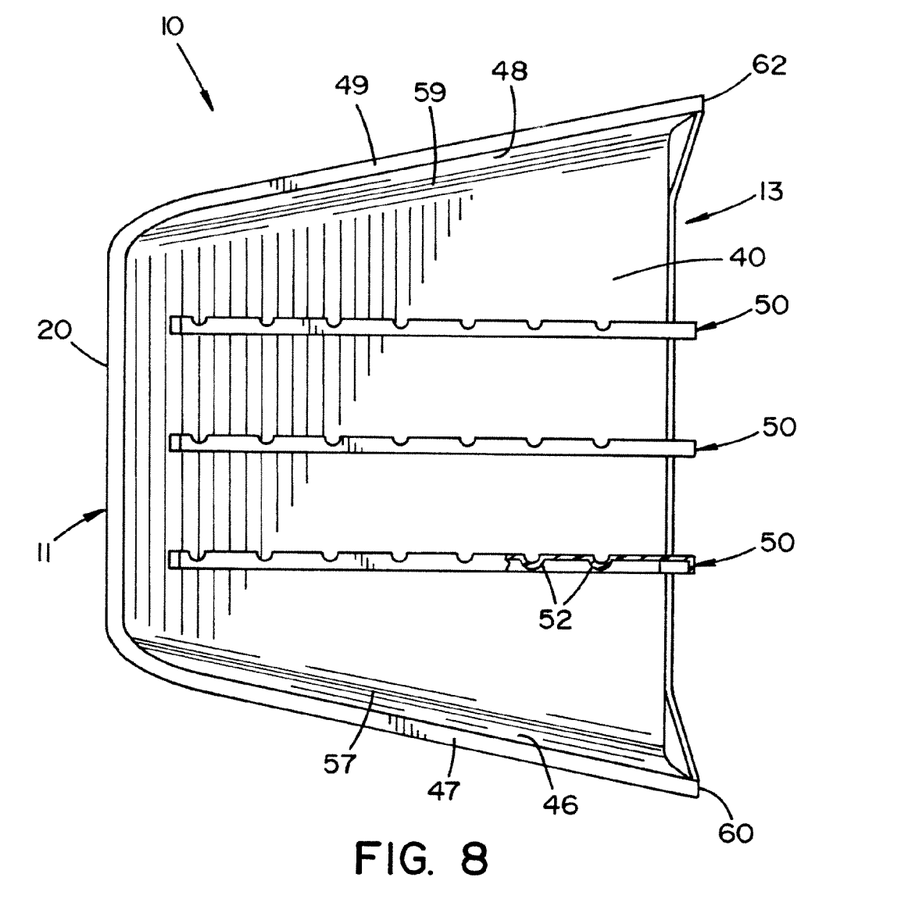
FIG. 8 is a top elevational view of the airstream fairing deflector of FIG. 1.
Figure 9:
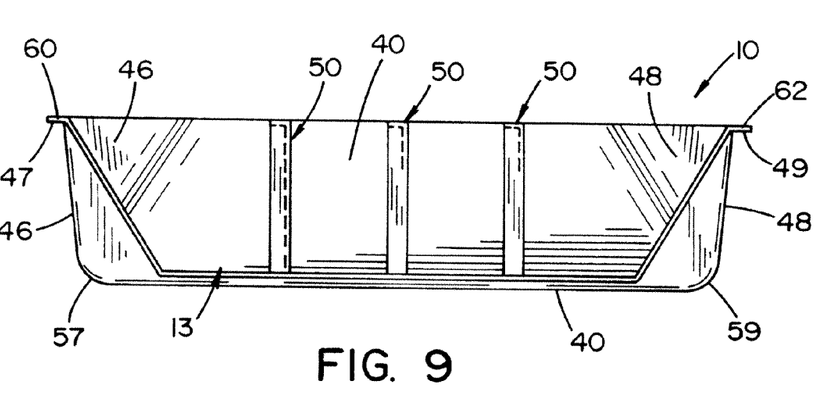
FIG. 9 is a rear elevational view of the airstream fairing deflector of FIG. 1.
Figure 10:
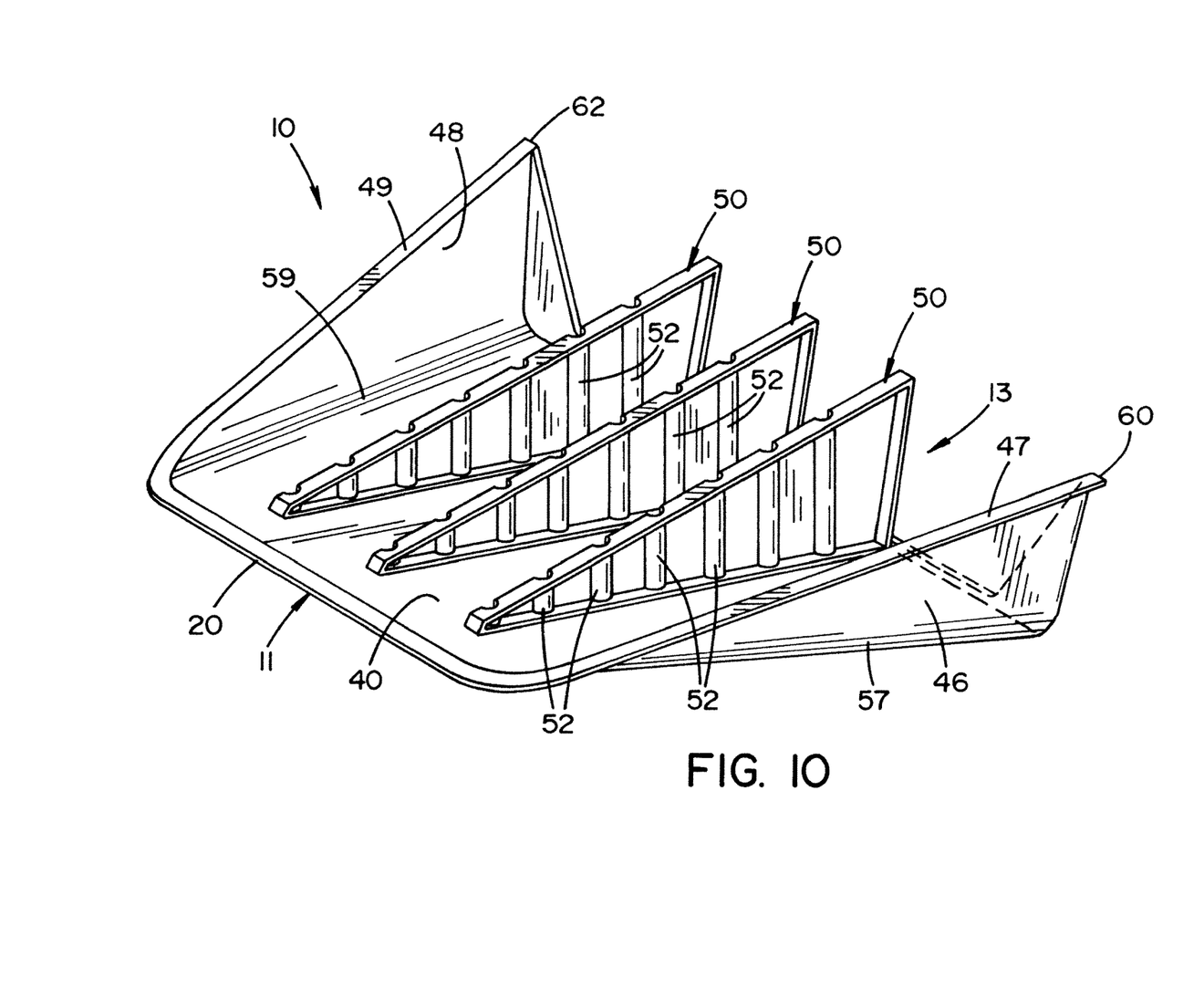
FIG. 10 is a top perspective view of another embodiment of the airstream fairing deflector.

As shown in FIGS. 1 and 2, the disclosed fairing location provides improved aerodynamics. Existing tractor and trailer profiles have less than optimum aerodynamics that begin at the forward end of the trailer and then are compounded by the poor aerodynamic profiles at the rear axle(s) 16, rear tire sets 15, and other related mounted components. The presently disclosed fairing 10, and the respective disclosed mounting position, provides improved aerodynamics from the resulting airstream turbulences caused by the aforementioned trailer bodies and components and re-directs the airflow for improved aerodynamics at the fairing location and downstream therefrom. The mounting position can be fixedly set to the underside 14 of the trailer 18 generally at the midpoint of the trailer and in front of the trailer slide rails 30. The slide rails 30 are used on trailers 18 to adjust the rear wheel locations. In the selected dimensioned trailer 18 example, the fairing 10 can be permanently or fixedly mounted and requires no adjustment from the its fixed position with its center from about 18 feet to about 30 feet from the front edge 19 of the trailer 18. The relative mounting position of the fairing, and the respective spacing from the rear of the trailer, can be scaled accordingly based on the dimensions of the trailer 18. In another mounting arrangement, the front edge 11 of the deflector 10 can be mounted from about 16 feet to about 28 feet from, or rearward of, the front 19 of the trailer 18.

Prior art mounting positions have typically been adjacent to a location very near the front of the rear tire system. The presently disclosed mounting position provides aerodynamic air direction changes different from the prior art since the fairing 10 is positioned at a different area of the undercarriage which results in different air flows over much longer distances relative to the trailer dimensions. The presently disclosed mounting position is a relatively large distance from the rear tire set, and therefore, avoids damage from tire failures. The fixed mounting position also eliminates the more expensive requirement of mounting devices that synchronize the position of the fairing with respect to the adjustable positions of the rear trailer tire system along the slide rails. As described above, the mounting position also provides protective shielding of the connecting brake line cabling etc that is forward of the rear tire system.

For simplicity and clarity of illustration, the underside 14 of a partial trailer 18 is shown simply in FIG. 2, displaying conventional details thereof such as the cross I-beams and other air brake hose systems. It is to be appreciated that the fairing 10 improves the aerodynamics around these components. In addition, fairing 10 protects the aforementioned components attached to the undercarriage 14 of the trailer 18 from the elements and other road debris.

Figure 11:
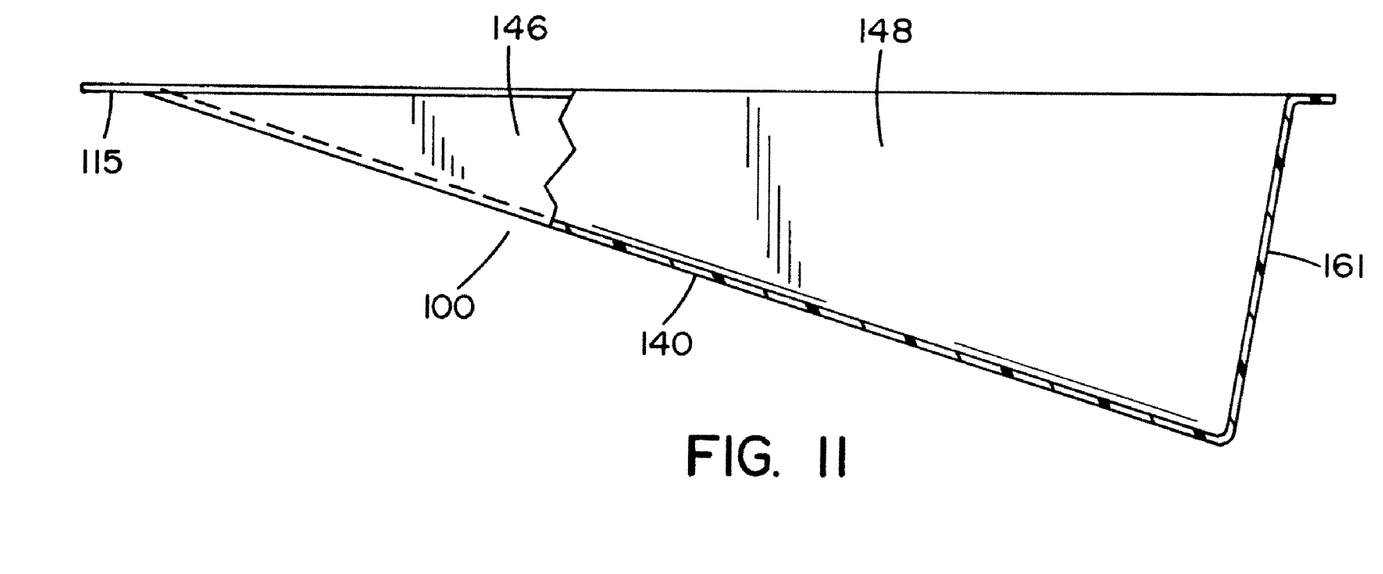
FIG. 11 is a side view partially in section according to another embodiment of the present disclosure.

FIG. 11 schematically portrays another embodiment of the deflector fairing 100 according to the present disclosure. This second embodiment displays a generally five sided closed shell design which creates an enclosure than can be used for housing controls or other equipment mounted to the underside of the trailer (i.e. air brake hose lines). The deflector fairing 100 can include an angled panel 140 having an angle of declination from about 12 to about 24 degrees. The fairing 100 includes a top edge or perimeter 115 having means for mounting to the underside 14 of the trailer 18. The deflector fairing 100 also includes a rear panel 161 and two side panels 146, 148. Alternatively, the fairing can be a solid body design, albeit without an enclosure area.

Figure 13:
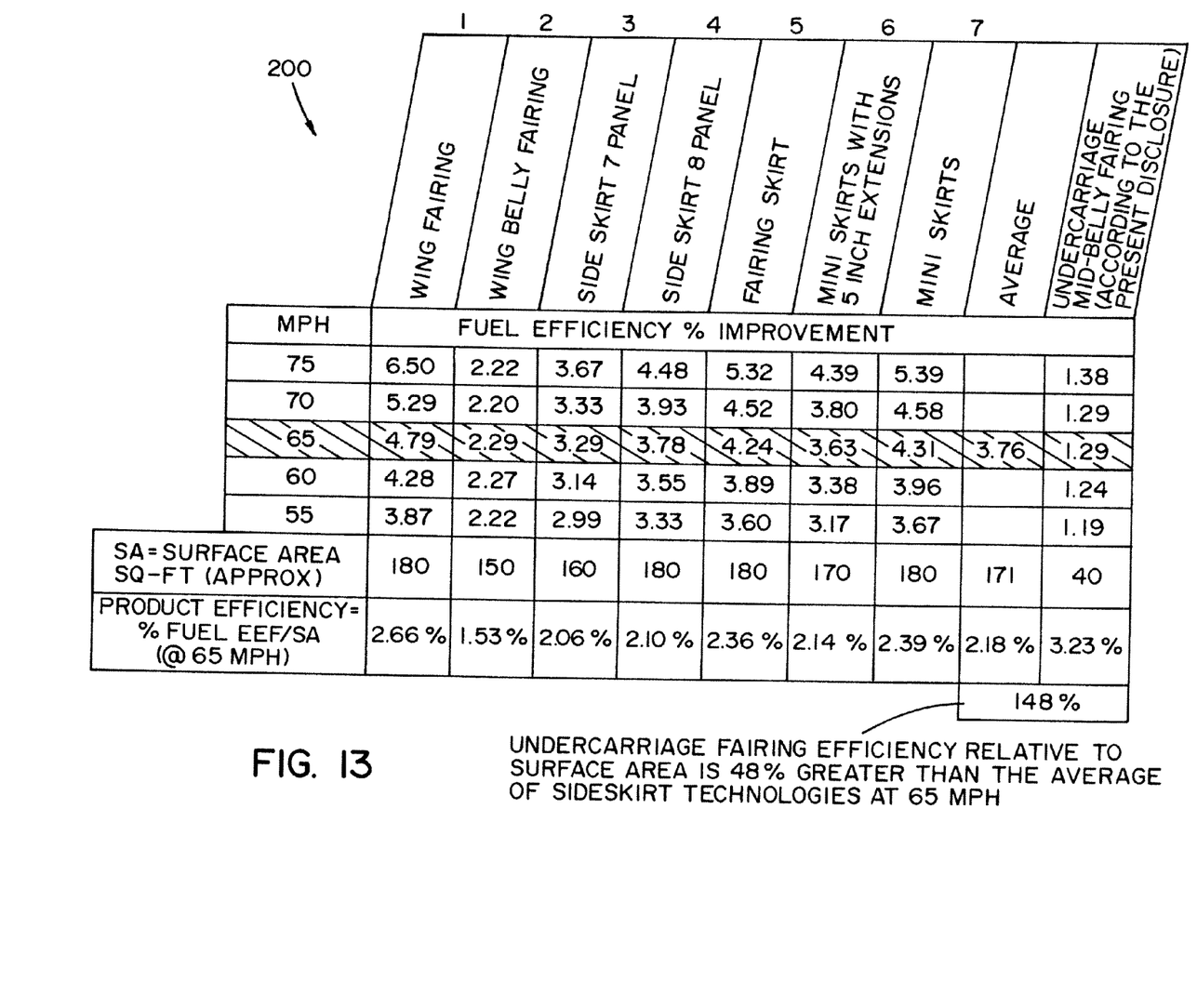

Operational testing of a deflector fairing 10 according to the present disclosure, including wind tunnel testing and actual road tests, yielded an improvement of at least 1 percent fuel efficiency savings 200, as compared with comparable operation of the same tractor trailer without the deflector fairing installed (FIG. 13). At varying speeds, i.e. between 75 mph and 55 mph, improved fuel savings ranged from 1.38% at 75 mph to 1.19% at 55 mph.

Considering that the semi-trailer 18 has a typical standard trailer width of approximately 8.5 feet, the deflector fairing 10, 100 shown in FIGS. 1-11, would be understood to be from about 5.5 feet to about 8.1 feet in width at the aft end 13 and from about 4 feet to about 8 feet in length. The area of the bottom panel 40, 140, including the angled horizontal main and vertical side panels, is from about 30 to about 56 square feet. The area of the angled main or bottom panel 40, 140 can be from about 20 to about 43 square feet.

The fairing 10, 100, as described, represents a relatively minor modification to the undercarriage 14 of the trailer 18. In addition, the fairing 10, 100 represents a relatively small fairing 10, 100 when comparing the size, i.e. square footage of surface area, of the fairing in relation to the square footage of the undercarriage of a trailer, but provides a significant improvement in drag reduction. In addition, the fairing 10, 100 is a relatively inexpensive and easily mountable device (i.e. mountable without drilling into the undercarriage or "I" beams) that can provide improved performance for a large number of applications in association with trailers, flat beds, box trucks, etc. The fairing 1, 100 as described, has relatively minimal extension or drop height (at its greatest point of extension) below the undercarriage 14 of the trailer 18, thus providing improved ground clearance and improved durability relative to other larger and more cumbersome devices heretofore known. The aforementioned mounting arrangement, accompanied by the relative smaller dimensions, provides for a fairing that includes greater ground clearance and more durability and resistance to road debris. The extra ground clearance and narrower width provides protection from damage that could occur at railroad crossings, curbs, dock ramps, etc.

FIG. 12 displays a clamp 160 that enables the fairing 10 to be secured to the undercarriage 14 of the trailer 18. In one arrangement the clamps 160 are spaced in substantially one foot intervals. The clamps 160 can be attached to the fairing perimeter using common attachment means (i.e. bolts and nuts, screws, or the like). The clamps 160 can be located and equi-spaced about a peripheral edge of the deflector 10. Thus, the periphery of the deflector 10 can be secured to the underside 14 of the trailer 18 by clamp means. The bolts and nuts can be used to hold the clamps 160 to the fairing 10, and once the fairing 10 is in the mounting location, the bolts can be tightened which will enable the clamps to apply a clamping force to the undercarriage "I" beam as it sandwiches the "I" beam between the clamp and the fairing body periphery. It is to be appreciated that the deflector fairing 10 can be mounted without drilling into the undercarriage 14, or "I" beams, of the trailer 18. It is to be appreciated that clamps 160 can also be used to secure the reinforcement members 52 to the undercarriage 14 of the trailer 18. The clamps 160 can remain connected to the fairing 10 when the fairing 10 is removed from the undercarriage 14. Due to the mounting location of the fairing 10, some clamps 160 attach to the aft side of the undercarriage "I" beams while other clamps 160 attach to the front side of the "I" beams in order to trap the fairing 10 in place on the undercarriage and prevent it from being dislodged.

Referring now to FIG. 13, a table is displayed showing various drag reducing devices and the associated wind tunnel test data resulting therefrom. The table shows seven varieties of drag reducing apparatuses which are then compared to the drag reduction results of the undercarriage fairing described in the present disclosure. The wind tunnel tests were conducted at varying miles per hour and the data was tabulated accordingly. The percent improvement of fuel efficiencies were tabulated for each of the seven respective devices. Results were tabulated for varying speeds ranging from 55 mph to 75 mph in 5 mph increments. The surface area in square feet was also determined for each of the seven respective devices. A product efficiency was calculated which comprises the percent fuel efficient savings divided by the surface area of the device (at 65 mph) and the results are therein shown. In order to attempt a comparison of the undercarriage fairing to the seven respective devices, a similar calculation was made wherein the percent improvement in fuel efficiency was divided by the surface area of the undercarriage fairing. The resulting product efficiency of the undercarriage fairing was 3.23%. The average product efficiency of the seven respective devices compared thereto was 2.18%. Thus, the undercarriage fairing product efficiency, i.e. relative to surface area, resulted in a benefit of greater than 148% relative to the average of the other seven respective devices compared thereto. In other words, the percent improvement in fuel efficiency relative to the surface area of the device resulted in a 148% improvement of the aforementioned comparable side skirt fairing devices.

The surface area of the undercarriage fairing is generally less than $\frac{1}{4}^{th}$ the surface area used in side skirts. As discussed above, the product efficiency is 48% greater than the average of the side skirt technologies tested at 65 mph.

While considerable emphasis has been placed herein on the structures and structural interrelationships between the component parts of the embodiments discussed in the disclosure, it will be appreciated that many embodiments can be made and that many changes can be made in the embodiments herein illustrated and described without departing from the principles of the disclosure. These and other modifications of the disclosed embodiments as well as other embodiments of the disclosure will be suggested and obvious to those skilled in the art, whereby it is to be distinctly understood that the foregoing descriptive matter is to be interpreted merely as illustrative of the disclosure and not as a limitation.

What is claimed is:

1. An airstream deflector comprising:
   an airstream deflector fairing including a front end having a width, said front end including a leading edge attached to an undercarriage of a wheeled vehicle;
   the fairing including a rear end having a width, said rear end including a trailing edge attached to the undercarriage of the wheeled vehicle;

said rear end width greater than said front end width whereby said fairing increases in width from said front end to said rear end;

said fairing including a lower bottom panel facing the ground which directs an airstream passing thereunder downwardly and outwardly relative to the undercarriage and substantially at an area below a trailing axle downstream from the fairing; and, the lower bottom panel having an angle of declination relative to the undercarriage from about 12 degrees to about 24 degrees whereby said bottom panel slopes away from the undercarriage of the vehicle from said front end leading edge to said rear end.

2. The deflector of claim 1, wherein the lower bottom panel extends in a planar form from the front end leading edge to the rear end including an angle of declination from about 13 degrees to about 18 relative to the planar undercarriage of the trailer.

3. The deflector of claim 1, wherein the fairing is mounted in a position upstream from a pair of slides mounted to the undercarriage of the trailer;

the mounting position provides a space between the rear end of said fairing and the rear tire set; and the space is at least as long as a length of the fairing.

4. The deflector of claim 1, wherein the fairing is mounted in a position relative to the front of the trailer;

the mounting position includes the front end of the fairing being from about 15 feet to about 28 feet from the front of the trailer;

the mounting position provides a space between the rear end of said fairing and the rear tire set; and, the space includes a minimum of at least six feet thereby accommodating fore and aft movement of the rear tire set without moving the fairing.

5. The deflector of claim 2, wherein the front end width is at least 30% less than the rear end width.

6. The deflector of claim 5, wherein the fairing is centered between opposing sides of the undercarriage and the front end width is from about 40 percent to about 60 percent of the width of the undercarriage.

7. The deflector of claim 6, wherein the fairing is centered along the width of the undercarriage and the rear end width is from about 70 percent to about 90 percent of the width of the undercarriage.

8. The deflector of claim 5, wherein the fairing is centered along a width of the undercarriage and the rear end width is from about 70 percent to about 90 percent of the width of the undercarriage.

9. The deflector of claim 2, wherein the fairing includes a first side panel and a second side panel; and, the lower bottom panel extends in a planar form between the first side panel and the second side panel.

10. The deflector of claim 9, wherein the first side panel includes a first side edge and the second side panel includes a second side edge; and, the first side edge and the second side edge are connected to the undercarriage.

11. The deflector of claim 9, wherein the first side panel, the second side panel, and the bottom panel define an enclosed space for housing mechanical equipment of the wheeled vehicle extending below the undercarriage.

12. The deflector of claim 11, wherein the fairing includes at least one support rib extending from the front end to the rear end within the enclosed space.

13. The deflector of claim 1, wherein the rear end width spans less than the undercarriage width of a wheeled vehicle substantially from the midpoint of one rear tire set to the midpoint of another opposing rear tire set.

14. The deflector of claim 10, wherein the first side panel and the second side panel each being substantially planar along at least a portion thereof for deflecting air around the sides of the respective trailing tire sets.

15. The deflector of claim 1, wherein directed airstream area is between the ground surface below and a horizontal plane parallel to the ground surface and intersecting the trailing axle above.

16. An airstream deflector comprising:

an airstream deflector fairing including a front end having a leading edge attached to an undercarriage of a wheeled vehicle;

the fairing including a rear end having width;

a lower bottom panel connecting the front end and the rear end wherein the lower bottom panel faces the ground and directs an airstream passing thereunder downwardly and outwardly relative to the undercarriage and substantially at an area below a trailing axle following the fairing;

the lower bottom panel having an angle of declination relative to the undercarriage from about 12 degrees to about 24 degrees whereby said bottom panel slopes away from the undercarriage of the vehicle from said front end leading edge to said rear end;

the fairing includes a first side panel and a second side panel wherein the lower bottom panel extends between the first side panel and the second side panel;

the first side panel and the second side panel each being substantially planar along at least a portion thereof for deflecting air around the respective sides of the trailing rear tire sets; and, wherein the airstream area is substantially between the ground surface below and a horizontal plane parallel to the ground surface and intersecting the trailing axle above.

17. The deflector of claim 16, further comprising:

the front end having a width;

the front end width less than the rear end width; and, the lower bottom panel extends in a planar shape from the front end leading edge to the rear end.

18. The deflector of claim 17, wherein the fairing is mounted in a position relative to a trailing rear tire set;

the mounted position provides a space between the rear end and the rear tire set; and, the space is at least as long as a length of the fairing.

19. The deflector of claim 17, wherein the fairing is mounted in a position upstream from a trailing rear tire set;

the mounted position provides a space between the rear end and the rear tire set; and, the space is at least five feet thereby accommodating fore and aft movement of the rear tire set without moving the fairing.

20. The deflector of claim 17, wherein the front end width is at least 40% less than the rear end width.

21. The deflector of claim 20, wherein the fairing is centered along a width of the undercarriage and the front end width is from about 36 percent to about 60 percent of the width of the undercarriage.

22. The deflector of claim 21, wherein the fairing is centered along the width of the undercarriage and the rear end width is from about 65 percent to about 90 percent of the width of the undercarriage.

23. The deflector of claim 20, wherein the fairing is centered along the width of the undercarriage and the rear end width is from about 65 percent to about 90 percent of the width of the undercarriage.

24. The deflector of claim 23, wherein the first side includes a first side edge and the second side panel includes a second side edge; and, the first side edge and the second side edge are connected to the undercarriage.

25. The deflector of claim 23, wherein the first side panel, the second side panel, and the bottom panel define an enclosed space extending below the undercarriage for housing mechanical equipment of the wheeled vehicle.

26. The deflector of claim 25, wherein the fairing includes at least one support rib extending from the front end to the rear end within the enclosed space.

27. The deflector of claim 16, wherein the rear end width spans the undercarriage of a wheeled vehicle substantially from the midpoint of one rear tire set to the midpoint of another opposing rear tire set.

28. The deflector of claim 16, wherein the first side panel includes a planar surface that tapers to the rear and the second side panel includes a planar surface that tapers to the rear.

29. The deflector of claim 16, wherein the deflector includes a drop height of up to 26 inches.

* * * * *